(12) United States Patent
Hunt

(10) Patent No.: US 11,794,896 B2
(45) Date of Patent: Oct. 24, 2023

(54) EMERGENCY RESPONSE DRONE

(71) Applicant: Gene Hunt, Chicago, IL (US)

(72) Inventor: Gene Hunt, Chicago, IL (US)

( * ) Notice: Subject to any disclaimer, the term of this patent is extended or adjusted under 35 U.S.C. 154(b) by 288 days.

(21) Appl. No.: 17/243,103

(22) Filed: Apr. 28, 2021

(65) Prior Publication Data
US 2022/0348321 A1 Nov. 3, 2022

(51) Int. Cl.
| | |
|---|---|
| *B64U 50/00* | (2023.01) |
| *B64C 39/02* | (2023.01) |
| *B64D 47/00* | (2006.01) |
| *H04W 4/40* | (2018.01) |
| *B64U 101/00* | (2023.01) |
| *B64U 101/20* | (2023.01) |
| *B64U 101/30* | (2023.01) |

(52) U.S. Cl.
CPC ............ *B64C 39/024* (2013.01); *B64D 47/00* (2013.01); *H04W 4/40* (2018.02); *B64U 50/00* (2023.01); *B64U 2101/00* (2023.01); *B64U 2101/20* (2023.01); *B64U 2101/30* (2023.01)

(58) Field of Classification Search
CPC ....... B64C 39/024; H04W 4/40; B64D 47/00; B64U 2101/00; B64U 50/00; B64U 2101/30; B64U 2101/20
See application file for complete search history.

(56) References Cited

U.S. PATENT DOCUMENTS

| | | |
|---|---|---|
| 6,289,331 B1 | 9/2001 | Pedersen et al. |
| 9,471,059 B1 | 10/2016 | Wilkins |
| 10,198,954 B2 | 2/2019 | Holtzman et al. |
| 10,279,908 B2 | 5/2019 | Enos |
| 10,336,202 B2 | 7/2019 | Panopoulos et al. |
| 10,380,694 B1 | 8/2019 | Grant et al. |
| 10,579,863 B2 | 3/2020 | Volkart |
| 10,800,505 B1 | 10/2020 | Edsinger |
| 10,891,856 B1 | 1/2021 | Graham et al. |
| 2002/0026431 A1 | 2/2002 | Pedersen et al. |
| 2003/0126856 A1* | 7/2003 | Lair ........................ F02K 1/383 60/770 |
| 2016/0341531 A1 | 11/2016 | Kotenkoff et al. |
| 2017/0166067 A1 | 6/2017 | Panopoulos et al. |
| 2018/0029522 A1* | 2/2018 | Gordon .................... B60Q 1/52 |
| 2018/0037321 A1 | 2/2018 | Wilkinson |
| 2018/0050800 A1 | 2/2018 | Boykin et al. |
| 2018/0150087 A1 | 5/2018 | Enos |
| 2019/0146501 A1* | 5/2019 | Schick .................. B64C 39/024 701/3 |
| 2019/0283872 A1* | 9/2019 | Houston ................ B64U 10/13 |
| 2019/0347924 A1 | 11/2019 | Trundle et al. |
| 2020/0143718 A1 | 5/2020 | Salem |
| 2020/0164981 A1 | 5/2020 | Chundi |
| 2021/0031913 A1 | 2/2021 | Martel |

\* cited by examiner

*Primary Examiner* — Peter D Nolan
*Assistant Examiner* — Roy Rhee
(74) *Attorney, Agent, or Firm* — Dunlap Bennett & Ludwig, PLLC

(57) ABSTRACT

An emergency response drone having a multidirectional propulsion system and data capturing equipment and operatively associated computer system for providing information and situational awareness for emergency areas and related targets.

6 Claims, 5 Drawing Sheets

EMERGENCY RESPONSE DRONE

BACKGROUND OF THE INVENTION

The present invention relates to systems and methods directed to emergency responses and situational awareness and, more particularly, an emergency response drone.

During an emergency response, critical emergency information and situational awareness may be the difference between life and death; for instance, when police officers encounter an armed suspect, an active shooter, or other existential threats. In these situations, public safety personnel may lack sufficient amount of information regarding the location of the threat and the surrounding area (referred herein as the incident area or target area), and thus are limited in developing an appropriate response. As a corollary, the quicker the emergency information is collected and situational awareness disseminated, the better for the good guys.

As can be seen, there is a need for an emergency response drone adapted to respond to emergency situations, wherein the emergency drone is capable of reaching the scene in split-seconds through being designed to overcome weather related obstacles by way of its novel propulsions system. Additionally, the emergency drone is equipped with the latest technology as well as being configurable to communicate with external emergency system components.

The emergency response drone of the present invention succeeds through a propulsion system of mini turbines that enable the vessel to launch and go directly to the incident area. In short, the most glaring deficiencies during an emergency response is the lack of a plan of action to implement to neutralize the dangerous situation. Communication of the situation (situational awareness) is key because during an emergency, there can be a cacophony of data by way of dispatchers, squad operators, unit operators as well as screaming, explosions, sounds of shots, and/or loud, chaotic, or unusual sounds that need to be investigated and placed in context for emergency personnel to devise the most-effective response.

Accordingly, an aerial vehicle lends itself to the solution of the above-described problem. In fact, the seed for the present invention was planted in the minds of the inventors when, as police officers in their squad cars during an emergency situation, observed the superior effectiveness of aircraft flying overhead in terms of collecting information and gleaning situational awareness.

Of course, time is of the essence, and so the present invention has a novel propulsion system. The propulsion system of the includes a plurality of propulsion elements, wherein each propulsion element has a four-way tube fluidly coupled to high pressure elements to propel the drone. These tubes will afford individual jets to be fired selectively, individually or simultaneously; therefore, allowing pinpoint directions to the target area or the target itself.

The drone can be electrically associated with other components of an overall emergency response system, such as a dispatcher system, emergency input and output devices (e.g., image capturing technology) and sensors. Furthermore, an onboard imaging device of the drone may be controlled remotely by emergency responders or personnel. The drone may have other scientific instruments that enable the capture and dissemination of emergency information and situational awareness.

The emergency drone embodied in the present invention is a sophisticated systemic component of an overall emergency response system that is connected to the thousands of emergency input, sensor, and imaging devices that can quickly reach a target area and remain aloft for an extended amount of time as well as track and follow targets, capturing audible and imaging information of the emergency incident. Thereby, the present invention can be used to reduce crime, lessen police vehicle chases, reduce forest fires, assist rescue vessels, and even put out high rise fires.

SUMMARY OF THE INVENTION

In one aspect of the present invention, an aerial vehicle includes the following: a propulsion system having a plurality of propulsion element arranged in a circular pattern; and each propulsion element has three outlets arranged planarly.

In another aspect of the present invention, the aerial vehicle has the three outlets including two vertical outlets and a lateral outlet; a motive-inducing force diametrically opposed to the lateral outlet, wherein each outlet has a selectively controllable valve moveable between an open condition and a closed condition preventing thrust flowing through said outlet; an enclosure defined by a top cover, a bottom cover, and a side cover, wherein each cover provides a plurality of spaced apart outlet holes just inward of a peripheral edge of said cover, and wherein each outlet hole is dimensioned to receive one of the three outlets, wherein the enclosure houses a computer system electrically coupled through a wireless communication system to one or more devices of first responders; one or more infrared scanner operatively associated with the computer system and the enclosure; one or more visible light image capture device operatively associated with the computer system and the enclosure; one or more motion sensor operatively associated with the computer system and the enclosure; and one or more microwave sensor operatively associated with the computer system and the enclosure.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an emergency response drone 10.

Figure 1:
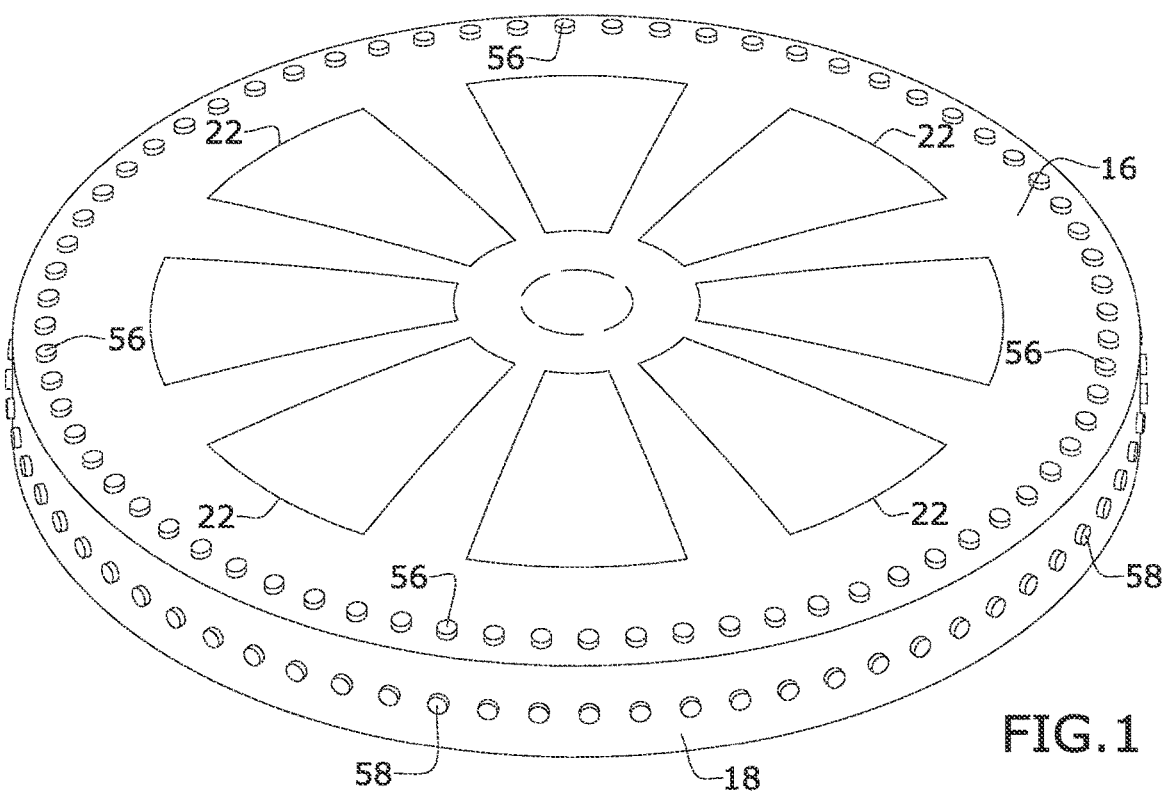
FIG. 1 is a top perspective view of an exemplary embodiment of the present invention.
Figure 2:
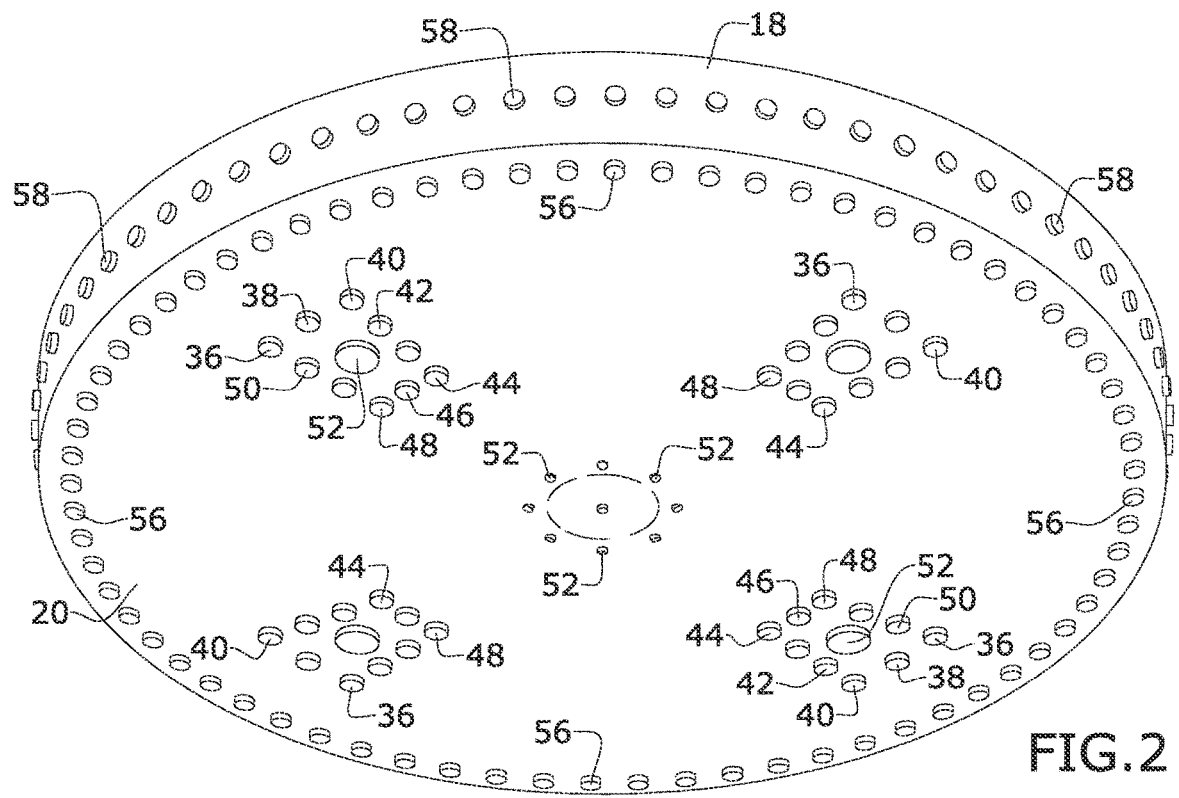
FIG. 2 is a bottom perspective view of an exemplary embodiment of the present invention.
Figure 3:
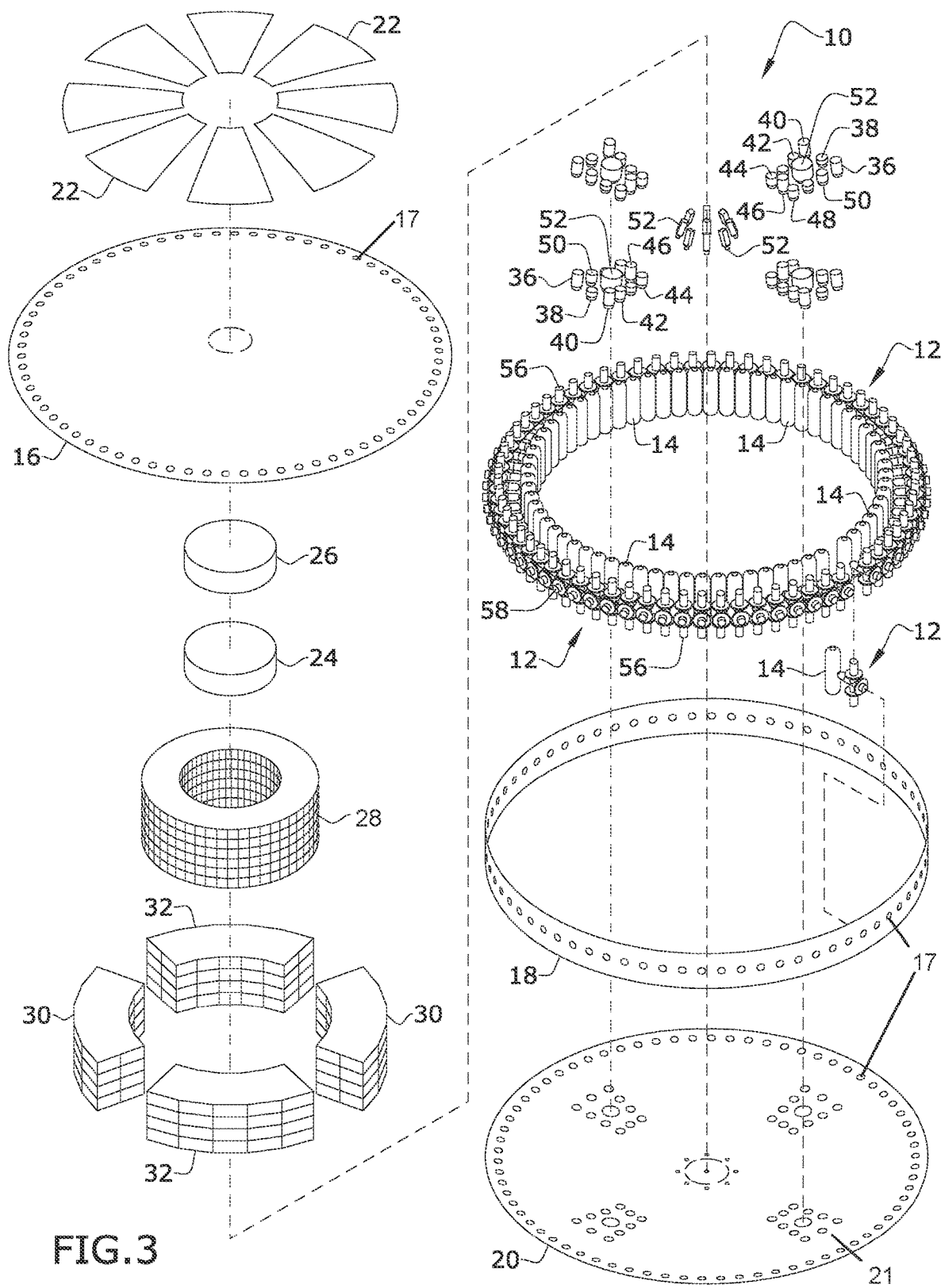
FIG. 3 is an exploded perspective view of an exemplary embodiment of the present invention.
Figure 4:
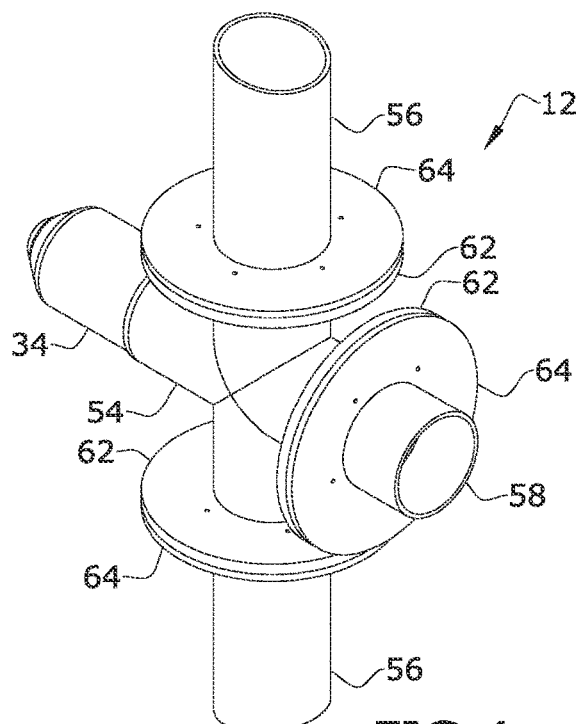
FIG. 4 is a perspective view of an exemplary embodiment of a propulsion element of the present invention.
Figure 5:
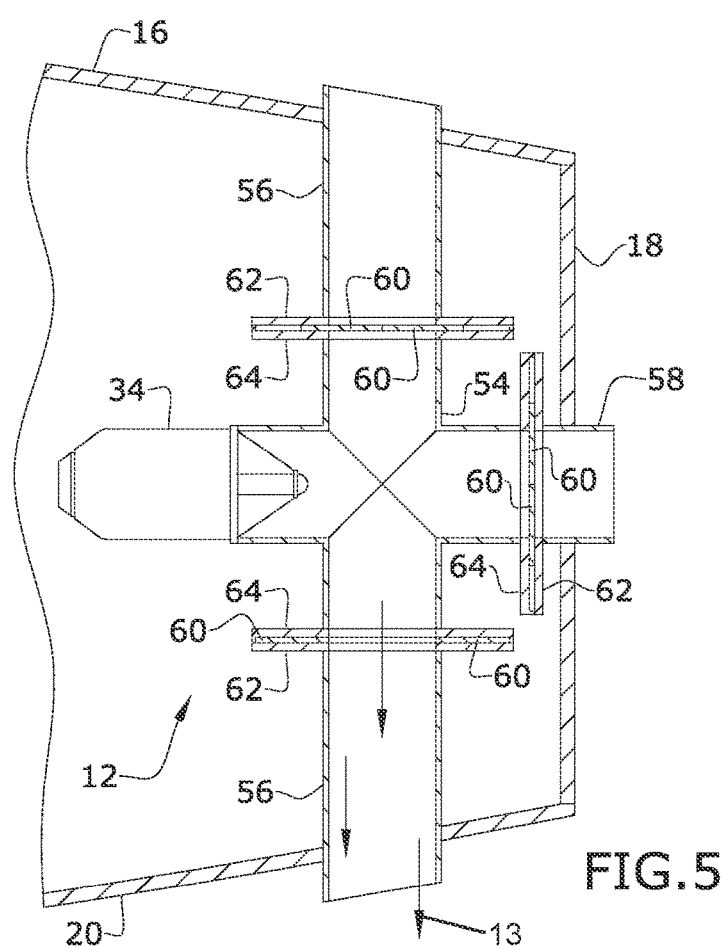
FIG. 5 is a section view of an exemplary embodiment of the propulsion element of the present invention, shown in FIG. 4.
Figure 6:
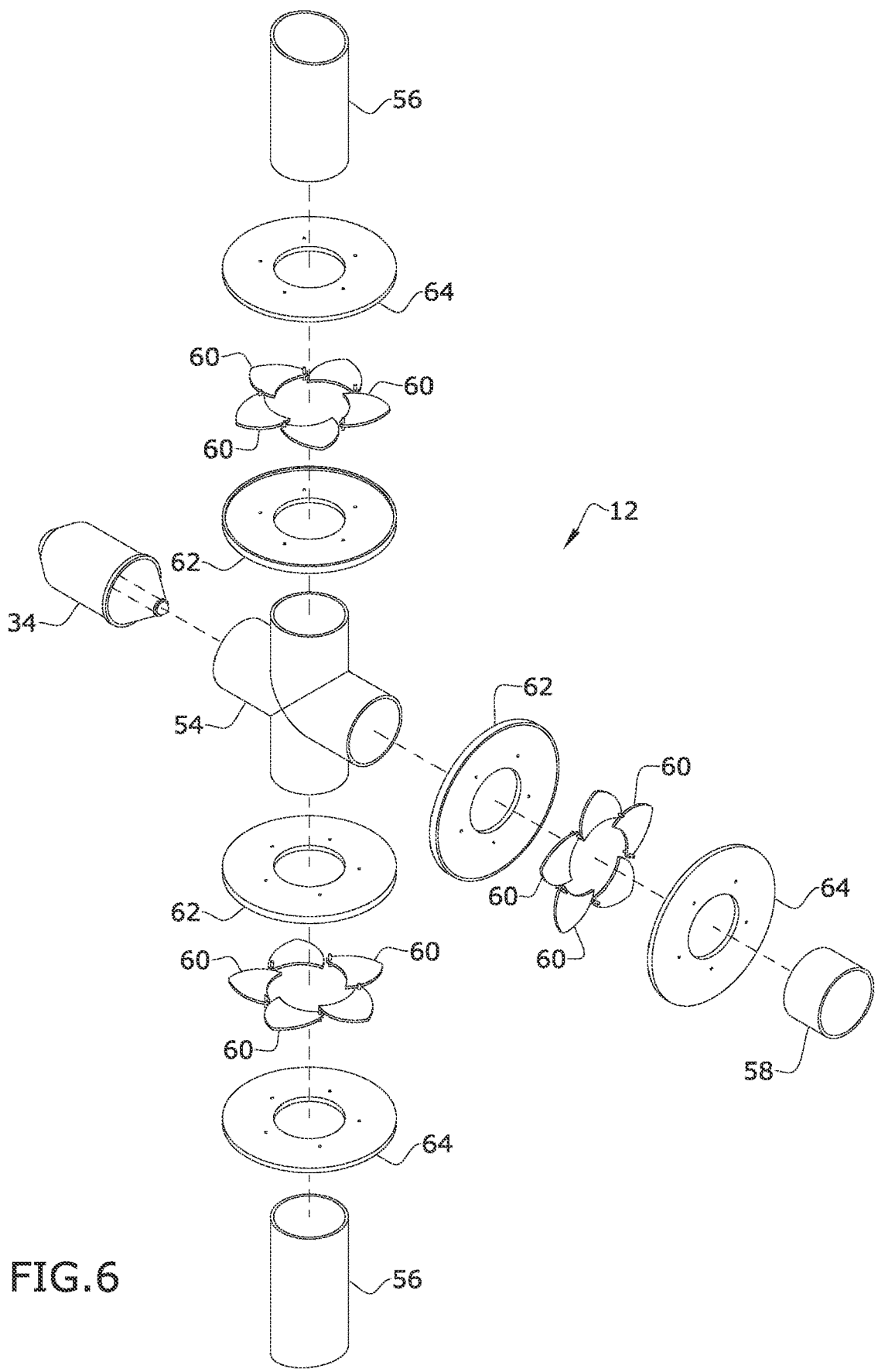
FIG. 6 is an exploded perspective view of an exemplary embodiment of the propulsion element of the present invention.
Figure 7:
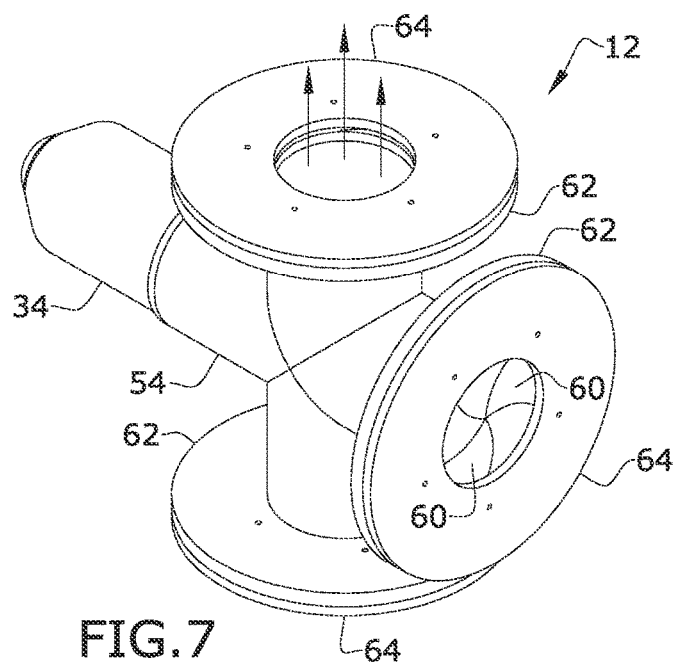
FIG. 7 is a perspective view of an exemplary embodiment of the propulsion element of the present invention, illustrating top thrust (urging downward movement)
Figure 8:
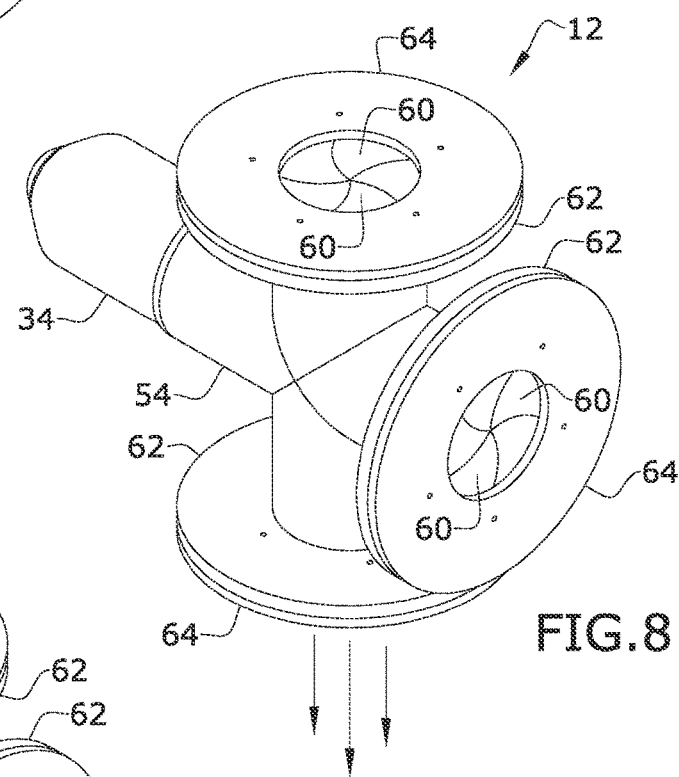
FIG. 8 is a bottom perspective view of an exemplary embodiment of the propulsion system of the present invention, illustrating bottom thrust.
Figure 9:
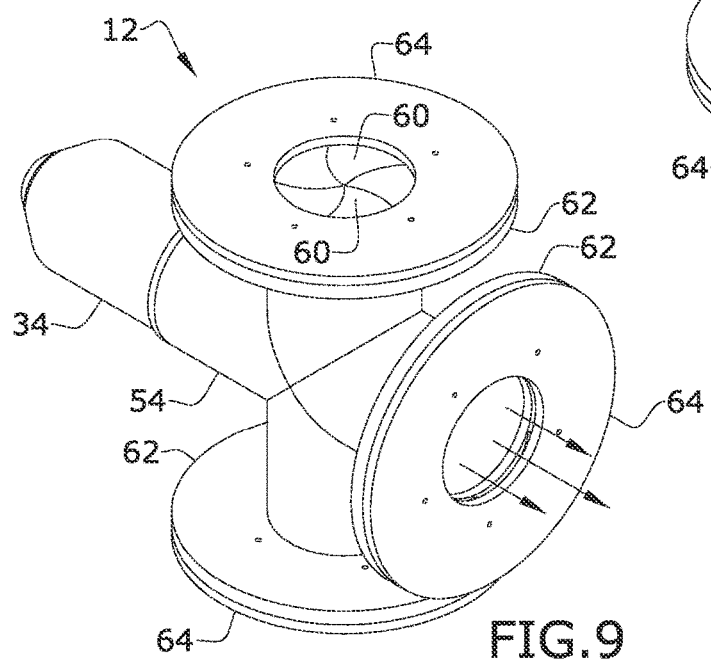
FIG. 9 is a bottom perspective view of an exemplary embodiment of the present invention, illustrating lateral thrust.

Referring now to FIGS. 1 through 9, the emergency response drone 10 includes a propulsion system enabling the drone 10 to cruise or stay afloat for a long period of time. The propulsion system may comprise a plurality of multi-directional propulsion elements 12. Each multidirectional propulsion element 12 may provide a four-way tube comprising a side thrust outlet 58, a top thrust outlet 56, and bottom thrust outlet 56 for lateral, downward and upward thrust 13, respectively. The remaining portal of the four-way tube is operatively associated with a turbine 34 for producing motive force. Each thrust outlet 58 and 56 may have iris fins 60 and operatively associated iris plate 62 or 64. The iris fins 60 may operate as exhaust valves, controlling the direction of thrust 13 by selectively enabling or disabling thrust 13 through their respective outlet. The plurality of multidirectional propulsion elements 12 may be arranged in circular fashion that utilizes as few as possible to obtain the synergistic effect of "one to three" (e.g., one constructed; with shutter/iris fin valves that allows the one to act as three: lateral, downward, and upward).

It should be understood by those skilled in the art that the use of directional terms such as side (lateral), top (upward), bottom (downward) and the like are used in relation to the illustrative embodiments as they are depicted in the figures. For instance, the downward direction being toward the bottom of FIG. 5, the upward direction being toward the top of FIG. 5, and lateral being toward the right side of FIG. 5.

The drone 10 may be an unmanned aircraft having a top cover 16, a side panel 18, and a bottom cover 20 connected to define an enclosure dimensioned and adapted to house the plurality of multidirectional propulsion elements 12, each fluidly coupled to a tube 14 of pressurized gas by way of the operationally associated turbine 34. The top cover 16, the side panel 18, and the bottom cover 20 provide a plurality spaced apart outlet holes 17 just inward of an edge. Each outlet hole 17 may be dimensioned and adapted to receive a respective thrust outlet 56 or 58.

The enclosure may also accommodate a computing device 24 coupled to a form of memory 26, a plurality of control circuitry 28, a power source 30, e.g., Hyzon batteries, composed of hydrogen cells or other energy containers 32. The top cover 16 may provide solar cells 22 electrically coupled to the energy containers 32.

The bottom cover 20 may provide openings 21 to enable data collection devices to capture and retrievably store data downward of the drone 10. The data collection devices may include, but are not limited to, smoke detector(s) 36, scent analyzer(s) 38, timing device(s) 40, infrared scanner(s) 42, sonic sound detector(s) 44, sound detector(s) 46, motion sensor(s) 48, microwave sensor(s) 50, and visible light image capture device(s) 52.

The computing device 24, memory 26 and control circuitry 28 includes at least one processor (e.g., a central processing unit (CPU), processor cores, compute nodes, etc.), a main memory and a static memory, which communicate with each other via a link (e.g., bus), defining a computer system. The computer system may further include a video display unit, an input device and a user interface (UI) navigation device. In one embodiment, the computer system may additionally include a storage device (e.g., a drive unit), a signal generation device (e.g., a speaker), a network interface device. The storage device includes a machine-readable medium on which is stored one or more sets of data structures and instructions (e.g., software) embodying or utilized by any one or more of the methodologies or functions described herein.

The computer system may be configured to respond to all available instruments owned and operated by an emergency response agency (e.g., a police department and their systemic components (e.g., "shot spotters", cameras and the like). The computer system may use of the "cloud" to store and perform operations pre-designed to instantly get aloft and maneuver and operate (spontaneously).

The computer system enables electrically controlled brakes and steering (through selectively opening and closing the valves 60) so that the drone 10 can avoid obstacles and pursue all eluding targets until they break down (e.g., run out of gas or voluntarily stop).

The computer system enables an operator of the drone 10 to capture visible images at various angles in or out of the drone 10 for capturing images of a target (e.g., vehicle) while moving and when stopped. With a bird's eye view the operator can supervise large or small incident areas. The drone 10 can provide instructions to first responders, taking photos of the target area and adjacent area to provide them with situational awareness.

In certain situations, a bypass, an exit off ramp or the like could be directed via the drone 10 through access to "Traffic Accident Report" information. And once there, taking photos of the incident (e.g., crash)—panoramic and bird's eye—as well as measurements (e.g., skid marks). The drone 10 should have no restrictions relative to flying altitudes and areas. The signals used to control the drone 10 may be controlled via "homeland security" and issued by them to various departments, wherein reports could reflect all States and jurisdictions. The Department of Transportation may inform other agencies as appropriate.

In some embodiments, when the target is a vehicle, the roadway and direction of the suspect's vehicle may be relayed to the drone 10 and the dispatcher simultaneously. Once the pursuing vehicle has given the drone all pertinent information and this information is confirmed, then other emergency vehicles in the vicinity will get involved, thereby the present invention may spearhead the emergency response. All emergency vehicles may be assigned to monitor the instructions by the dispatcher who is in contact with the drone 10. An optional aspect would be to assign tagging drones to assist in marking the eluding vehicle. The tagging drones can be docked with the main drone 10 because they are equipped with marking elements and much more maneuverable than the main drone.

The size of the drone 10 can vary according to the tasks they are assigned to perform; for example, 20 feet in diameter for chases and city crimes; 40 feet or more for forest; 30 feet for construction work (no need for a crane); and 10 feet for highway patrol, etc. It should be understood that the size of the drone 10 can be more or less than defined immediately above, and the shape of the drone 10 can be different that the disc-shape shown in the illustrations. In short, whatever size and shape enables the functionality disclosed herein is acceptable.

Special instruments may be used to avoid midair crashes. Added measures may include no open flames or no snooping court ordered for storage of all pertinent information. The drone 10 can be used for high rise fires (by being connected to water cannons or spray), wherein water or fire retardants will be stored in the forest at a pre-destined location.

A method of using the present invention may include the following. The emergency response drone 10 disclosed above may be provided. The operator may control the drone 10 remotely to move in any movement imaginable within three-dimensional space along a 360-degree coordinate system by selectively applying varying thrust 13 through the propulsions system 12 and valves 60.

It should be understood, of course, that the foregoing relates to exemplary embodiments of the invention and that modifications may be made without departing from the spirit and scope of the invention as set forth in the following claims.

What is claimed is:

1. An aerial vehicle comprising:
   a propulsion system comprising a plurality of propulsion elements arranged in a circular pattern;
   each propulsion element of the plurality of propulsion elements comprising three outlets arranged planarly, wherein the three outlets comprise two vertical outlets and a lateral outlet;
   a motive-inducing force diametrically opposed to the lateral outlet, wherein each outlet has a selectively controllable valve moveable between an open condition and a closed condition preventing thrust flowing through said outlet; and
   an enclosure defined by a top cover, a bottom cover, and a side cover, wherein each cover provides a plurality of spaced apart outlet holes just inward of a peripheral edge of said cover, and wherein each outlet hole is dimensioned to receive one of the three outlets.

2. The aerial vehicle of claim 1, wherein the enclosure houses a computer system electrically coupled through a wireless communication system to one or more devices of first responders.

3. The aerial vehicle of claim 2, further comprising one or more infrared scanner operatively associated with the computer system and the enclosure.

4. The aerial vehicle of claim 3, further comprising one or more visible light image capture device operatively associated with the computer system and the enclosure.

5. The aerial vehicle of claim 4, further comprising one or more motion sensor operatively associated with the computer system and the enclosure.

6. The aerial vehicle of claim 5, further comprising one or more microwave sensor operatively associated with the computer system and the enclosure.

* * * * *